Feb. 7, 1939.   J. S. PACE   2,146,222
COTTON PLANTER OPENER
Filed Aug. 6, 1937   2 Sheets-Sheet 2
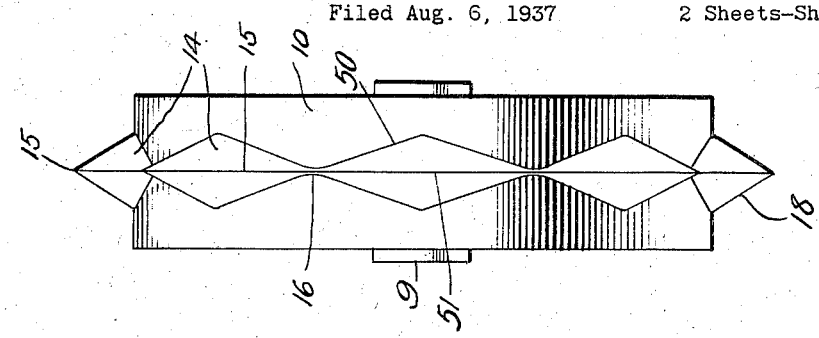
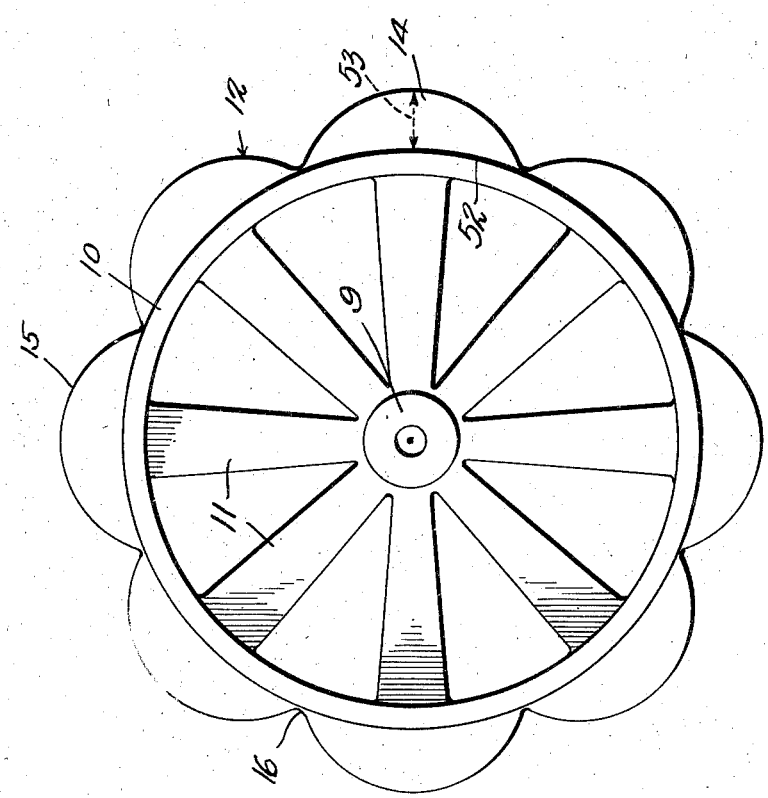
JOSEPH S. PACE
INVENTOR.
BY *CA Snow & Co.*
ATTORNEYS.

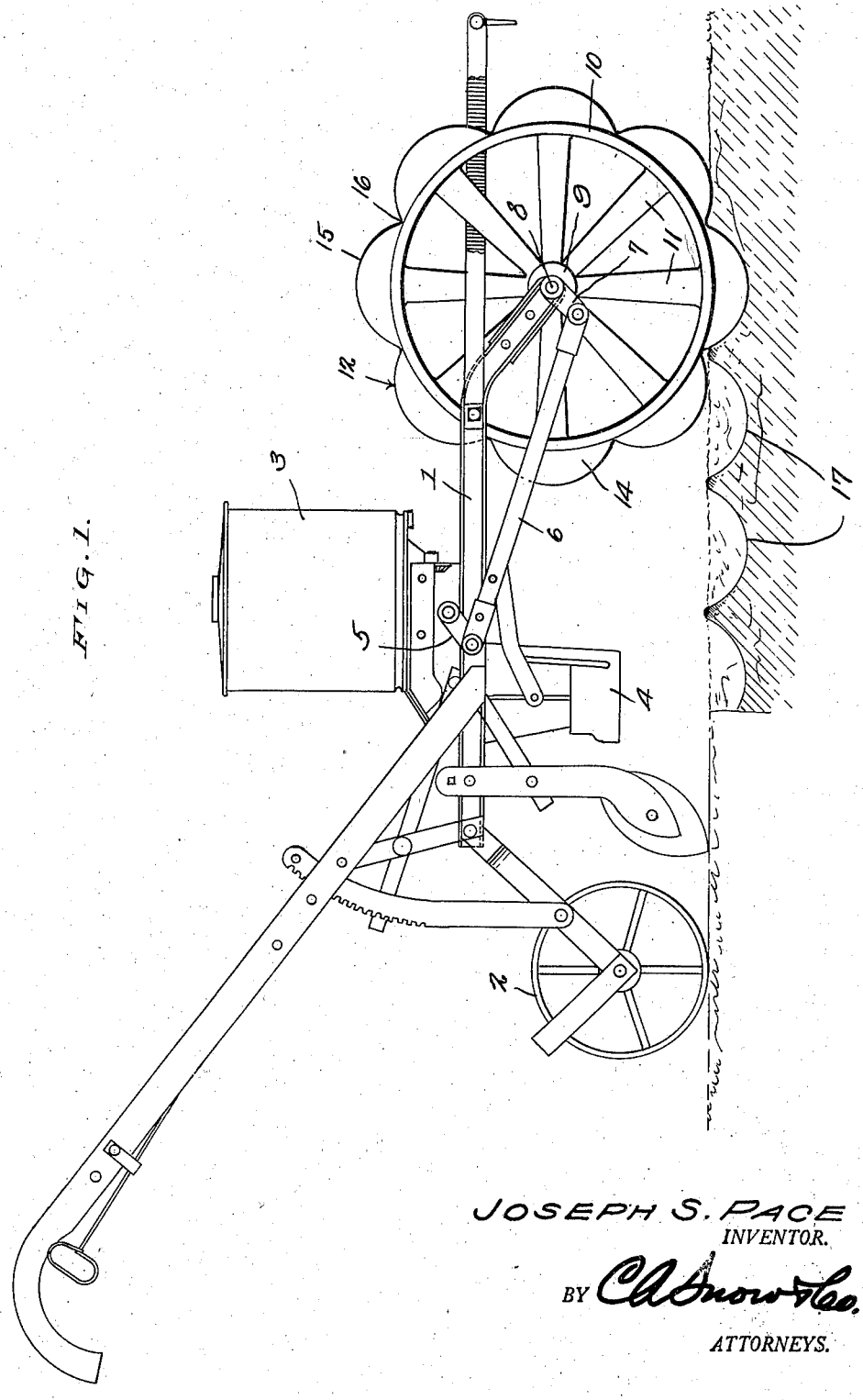

Patented Feb. 7, 1939

2,146,222

UNITED STATES PATENT OFFICE 2,146,222

COTTON PLANTER OPENER

Joseph S. Pace, Shreveport, La.

Application August 6, 1937, Serial No. 157,792

1 Claim. (Cl. 97—225)

Cotton seed is planted at a uniform depth. If planted too deeply, a heavy rain may drown it out, and a replanting is necessary. If too shallow a planting occurs, a drought may prevent germination, or if the seed is planted too early, the plant may be nipped by a cold wave, and a replanting is required.

This invention aims to provide a novel ground wheel for a cotton planter, so fashioned that a furrow of longitudinally continuous, wave-like form will be produced, the seed being planted at a varying depth, there being always some seed in the ground which will germinate and avoid the inconvenience and expense arising sometimes out of shallow planting and sometimes out of deep planting, a good stand of cotton being insured.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in side elevation, a cotton planter constructed in accordance with the invention;

Fig. 2 is a side elevation of the wheel forming the subject matter of this application;

Fig. 3 is an elevation wherein the wheel is viewed edgewise.

The wheel forming the subject matter of this application may be used on a walking cotton planter or on a riding cotton planter, but the drawings disclose a walking cotton planter only, it being understood that the wheel may be employed in connection with any planter to which it is adapted, whether a riding planter or a walking planter.

In the form of planter selected as an illustration, there is shown a frame 1 carrying at its rear end the usual ground wheels 2. A seed hopper 3 is mounted on the frame 1 and includes means 4 for discharging seed in the wake of the wheel forming the subject matter of this application, and into the furrow formed by said wheel. The mechanism for feeding the seed is shown at 5 and is operated by a pitman 6 pivoted to a crank 7 on a shaft 8 journaled on the forward end of the frame 1.

The wheel of my inventtion includes a hub 9 and a rim 10 connected by spokes 11.

The rim 10 is supplied intermediate its outer edges with an outstanding flange 12, made up of a plurality of tongues 14 having convexed outer edges 15, said edges meeting, end to end, at points 16 closely adjacent to the rim 10, thereby to form a furrow 17 of continuous wave-like form and of varying depth, the device being further characterized by the fact that the tongues 14 are wedge-shaped in cross section, as shown at 18 in Fig. 3.

The device is simple in construction, but owing to the fact that it includes means for forming a furrow of the shape shown at 17 in Fig. 1, the seed will be planted at varying depths, and the objects set forth in the opening portion of this specification will be consummated.

The foregoing statement that the seed will be planted at varying depths requires some explanation. The device forming the subject matter of this application includes a rim 10 provided with an outstanding flange 12 made up of a plurality of tongues 14, each of which has a diamond-shaped base 50, where it joins the rim, the outer edges 15 of the tongues 14 meeting, end to end, at points closely adjacent to the rim. The edges 15 of the tongues lie in planes which coincide with the longer diagonals 51 of the diamond-shaped bases 50, said edges being continuously convexed from end to end, the length 52 of said edges, projected on the rim, being at least twice the maximum distance 53 between said edges and the rim, measured radially of the rim. As a result of this construction, the tongues do not simply punch a plurality of holes in the ground, the slant of the walls of the holes being so great that all seed tends to gravitate to the bottom of the holes, thereby producing a planting of uniform depth. Rather, the seed is distributed along the bottom 17 of a wave-like furrow, as shown in Fig. 1, and the seed will be planted at different depths.

What is claimed is:

A furrow-opening wheel for a cotton planter, including a rim provided with an outstanding flange made up of a plurality of tongues, each of which has a diamond-shaped base where it joins the rim, the outer edges of the tongues meeting, end to end, at points closely adjacent to the rim, said edges lying in planes which coincide with the longer diagonals of the diamond-shaped bases, said edges being continuously convexed from end to end, the length of said edges, projected on the rim, being at least twice the maximum distance between said edges and the rim, measured radially of the rim.

JOSEPH S. PACE.